Jan. 13, 1942.     T. P. ROGERS     2,269,737
MEASURING DEVICE
Filed Sept. 6, 1940     2 Sheets-Sheet 1
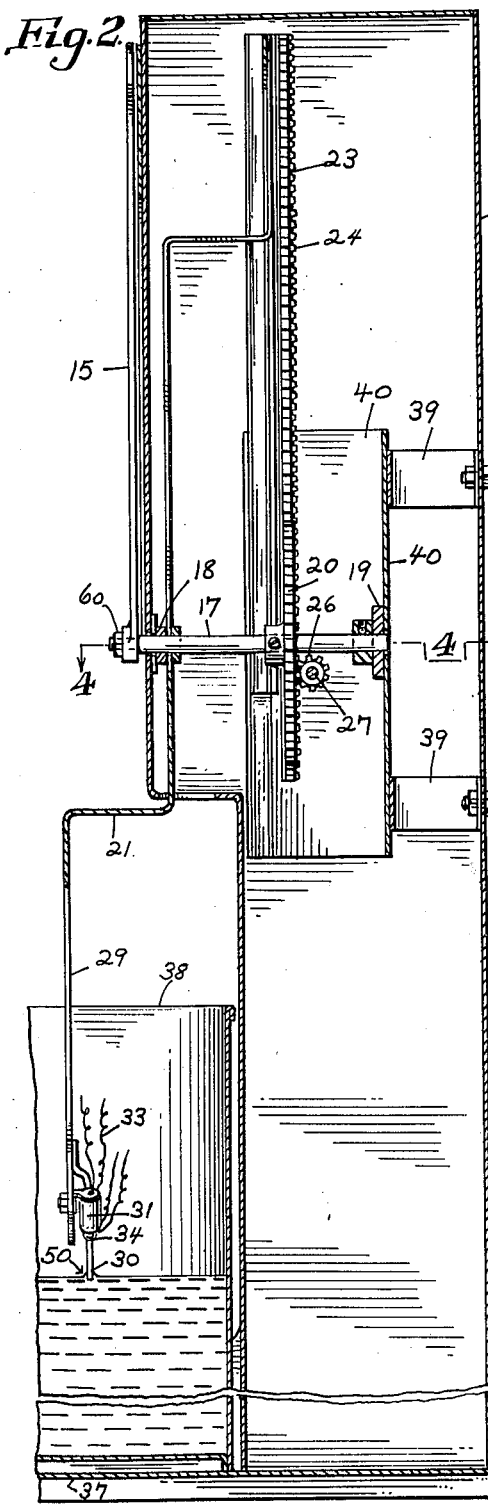
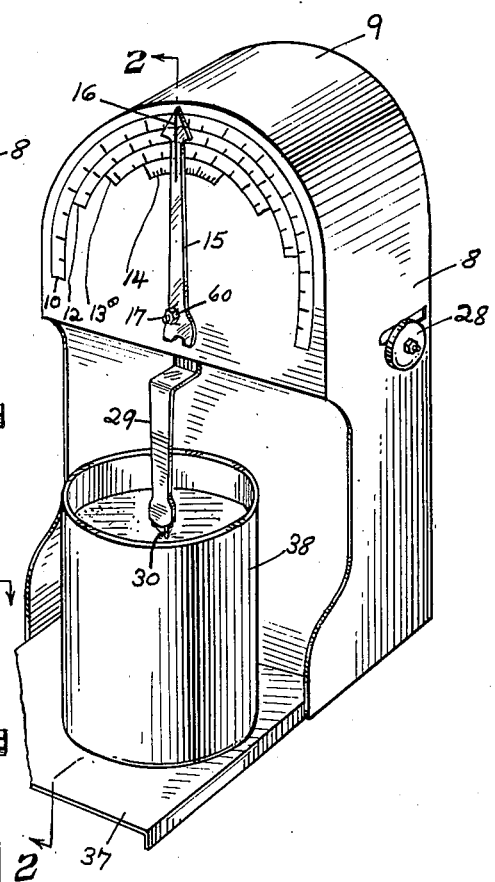
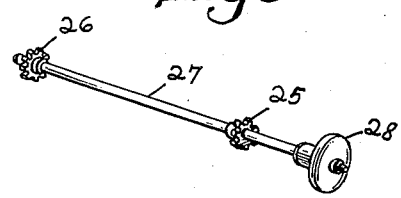
INVENTOR.
*Thomas P. Rogers*
BY
*Carlos G. Stratton*
ATTORNEY.

Jan. 13, 1942.  T. P. ROGERS  2,269,737
MEASURING DEVICE
Filed Sept. 6, 1940    2 Sheets-Sheet 2
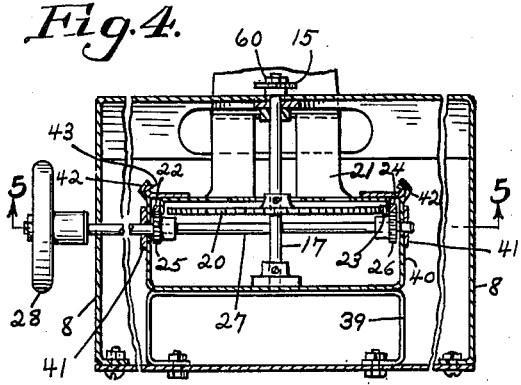
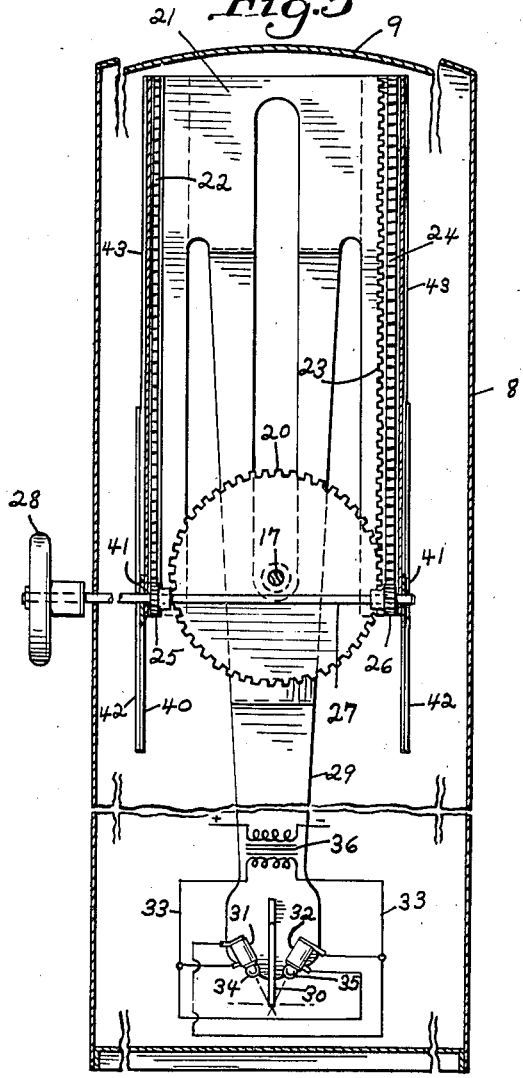
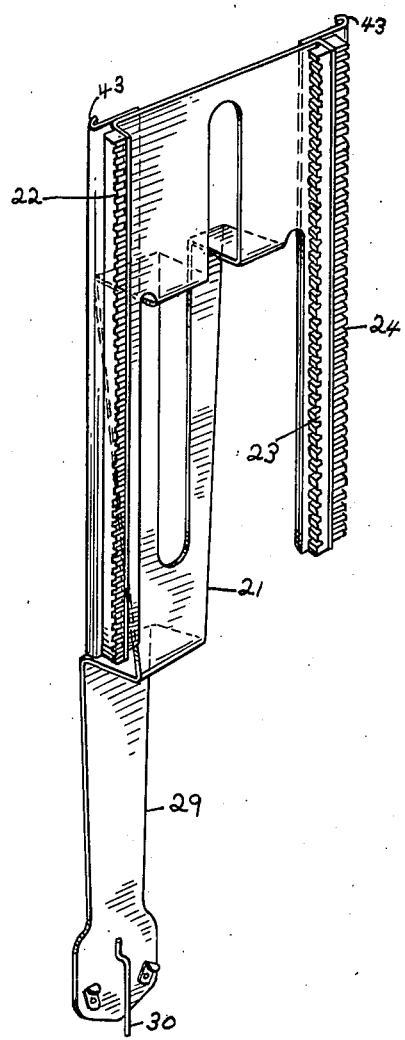
INVENTOR.
Thomas P. Rogers
BY Carlos G. Stratton
ATTORNEY.

Patented Jan. 13, 1942

2,269,737

UNITED STATES PATENT OFFICE 2,269,737

MEASURING DEVICE

Thomas P. Rogers, Los Angeles, Calif., assignor to Leon Finch, Ltd., Los Angeles, Calif., a corporation of California Application September 6, 1940, Serial No. 355,550

3 Claims. (Cl. 33—126.7)

My invention relates to a measuring device, and more particularly to a device for mixing determined amounts of ingredients, such as different liquids, to obtain a desired blend.

Another object of my invention is to provide means for accurately measuring different ingredients of paints, and the like, to obtain a desired shade of color.

Still another object is to provide means for progressively indicating inside a container, by illumination, the amount of liquid relative to gauge means.

Other objects include the provision of means to carry out the foregoing objects, which are positive in operation, convenient in use, improved structure, economy of manufacture, general superiority in speed and serviceability, relative simplicity, and greater general efficiency.

The invention also comprises novel details of construction and novel combinations and arrangements of parts, which will more fully appear in the course of the following description. However, the drawings merely show, and the following description merely describes, one embodiment of the present invention, which is given by way of illustration or example only.

Figure 1 is a perspective view, partly broken away showing an embodiment of my invention.

Figure 2 is an enlarged, broken, vertical section taken on the line 2—2 of Figure 1.

Figure 3 is a perspective view of a manual control comprised in the invention.

Figure 4 is a broken section, taken on the line 4—4 of Figure 2, but at right angles to Figure 2.

Figure 5 is a broken section taken on the line 5—5 of Figure 4, looking in the direction of the arrows.

Figure 6 is a perspective view of movable means comprised in the embodiment.

In the drawings, like reference characters designate similar parts in the several views.

Referring more in detail to the drawings, the reference numeral 8 generally designates a housing for the present mechanism. The housing has a rounded top 9 and carries at the front thereof a series of arcuate scales 10, 12, 13 and 14 for pints, quarts, half gallons and gallons, or any other units of liquid measure.

A pointer 15 cooperates with the dials. The pointer may be transparent with an opaque or other line 16 thereon, for accurately measuring the position of the pointer relative to the several dials.

The pointer is fastened on a shaft 17 by means of a nut 60. The shaft 17 rotates in bearings 18 and 19 at the front and back of the housing 8. A relatively large gear 20 is fastened on the shaft 17 about mid-way between said bearings.

A vertically movable carriage 21 has a rack 22 at one side thereof and has racks 23 and 24 at the opposite side thereof. The racks 23 and 24 are arranged at right angles to each other. The gear 20 meshes with the rack 23. Pinion gears 25 and 26 on a countershaft 27 respectively engage the racks 22 and 23. The shaft 27 projects outwardly from the housing 8. A hand wheel 28 or other suitable means fastened to the shaft 27 provides means for manipulation of the gears 25 and 26 and thereby provides manual means for raising and lowering the carriage 21.

An offset lower end 29 of the carriage 21, supports a downwardly depending rod 30 on the rear face thereof. Light bulbs 31, 32 are arranged on either side of the rod, also on the rear face. The rod 30 extends below the carriage end 29. Suitable wiring 33 connects the lights 31, 32 with a transformer 36. The light bulbs preferably have spherical lenses 34 and 35 for projecting well defined beams of light. The light bulbs 31, 32 are arranged for their beams to project downwardly at an acute angle to the horizontal, and for their beams to cross substantially at the lower end of the rod 30, as suggested by the crossed, broken lines leading from the lights in Figure 5.

The lower end of the housing 8 has a laterally projecting platform 37 for the support of a container 38.

Bracket means 39 supports a U-shaped bearing plate 40 that has bearings 41 for the support of the countershaft 27. The plate 40 is crimped vertically at its edges to afford opposed grooves 42 in which bent tongues 43 at the sides of the carriage 21 slide longitudinally. The grooves 42 act as guiding means for the sliding movements of the carriage 21.

In the ordinary and expected use of the present device, an empty container 38 is placed on the platform 37. Then a small amount of solvent, or other suitable light viscosity liquid, is first poured into the can, to successively maintain an upper surface that is uniformly horizontal. The solvent or other liquid used is of course readily wiped from the rod after use of the device. Then the carriage 21 is lowered until the lower end of the rod 30 contacts the surface of the solvent. The nut 60 is then loosened and the pointer 15 is set at zero on the scale corresponding to the particular size of the container. The nut 60 is then tightened.

The person using the device usually follows a definite formula. The first step in the mixing process is to set the rod the desired distance from the bottom of the container 38 by setting the pointer relative to the appropriate scale, depending upon the size of the container 38. The hand wheel 28 or other suitable means is utilized in so setting the pointer 15. The reading is obtained by looking through the transparent pointer 15 and comparing the appropriate scale with the line 16 on the pointer.

As an example, if the formula calls for the first ingredient to be 20% of the total, the pointer is moved until the line 16 is opposite 20% on the gallon scale (if the container 38 is a gallon measure), by means of the hand wheel 28. Then the desired ingredient is poured into the container until the rod 30 makes a concave meniscus 50 in the relatively thin layer of solvent floating on top of the first ingredient.

As the liquid level in the container approaches the lower end of the rod 30, the two spots of light on the surface caused by the lights 31, 32 come closer together. These spots of light substantially coincide at the time that the liquid level reaches the bottom of the rod 30.

Thus the spots of light provide progressive indicia within the container, as to the liquid level. The farther the liquid level is from the lower end of the rod 30, the farther apart are the light spots, and the closer the liquid level comes to the lower end of the rod 30, the closer together are the spots of light.

If the formula next calls for 40% of another ingredient, the pointer 15 is set by means of the hand wheel 28 at the 60% marker on the gallon scale (since the first and second ingredients together aggregate 60%).

Then as the second ingredient is poured into the container, the light spots progressively come closer together, as the liquid level approaches the bottom of the rod 30. The spots substantially coincide at the bottom end of the rod 30. As the spots come closer together, it is a warning to the user to pour more slowly. When a concave meniscus 50 is made in the liquid level by the rod, a sufficient amount of the second ingredient has been poured into the container.

The light viscosity solvent continues to float on the surface of the contents of the container, irrespective of the number of different heavier viscosity ingredients (such as different colored paints) that are poured into the container.

The process is continued until all of the ingredients called for by the formula are placed in the container.

By the present apparatus, it is possible for a paint dealer to carry in stock a relatively small number of colors of paints, such as the primary colors, and yet be able to provide for customers a relatively large number of colors.

The increased number, from year to year, of the different colors of automobiles on the market makes it almost prohibitive for the ordinary paint retailer to carry in stock ready mixed the hundreds of colors of the different automobiles put out by manufacturers in relatively recent years. However, by using the present apparatus, a retail paint dealer may accuracely mix any of the hundreds of desired colors. The paint manufacturer supplies the dealer with the formulae of all colors that may be reasonably expected in the ordinary course of business. When new models of automobiles come on the market, the paint manufacturer makes tests in its laboratory or otherwise determines the formulae that will produce from its paints all the colors of the new models. Thus the dealers are kept abreast of the public demand for different colors.

It is to be understood that any standard other than percentages (arbitrary or conventional) may be used in the scales and formulae.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications which may fall within the scope of the appended claims.

Having thus described my invention, what I claim and desire to secure by Letters Patent is:

1. A device for determining the height of a liquid level in a container, comprising a casing bearing a scale on its forward wall, a vertically shiftable carriage guided in its movements therein, having spaced apart vertical racks and a portion pendant therefrom through and below a portion of the casing centrally between said racks and provided centrally of its lower end with a liquid surface contacting element, a manually rotatable shaft journalled horizontally within the casing across said carriage, having an exteriorly projecting end and having pinions thereon in spaced apart relation and in mesh with the carriage racks, a pointer shaft journalled at right angles to said pinion shaft, having one end projecting externally through the forward wall of the casing, a pointer having a manually connectable and disconnectable mounting on said external end of the pointer shaft for cooperation with the casing scale, a gear member on the pointer shaft within the casing, and a third rack mounted on the carriage in mesh with the said gear member of the pointer shaft.

2. In a device for determining the height of a rising liquid level in a container, a supporting member adapted to be selectively positioned vertically in a container, a liquid surface contacting rod depending from said member, and lighting means stationarily supported on the said member and arranged to direct downwardly convergent beams focused on the lower extremity of said liquid contacting rod and diverging therebelow for producing spaced light spots on the surface of rising liquid below the element, which light spots approach one another as the liquid level approaches the said rod.

3. In a device for determining the height of a rising liquid level in a container, a supporting member adapted to be selectively vertically positioned in a container, a liquid surface contacting rod supported by, and depending from, said member, and lighting means stationarily supported on said member above, and at opposite sides of, said contact rod, for directing downwardly convergent fixed beams focused on the lower extremity of said rod and divergent below the rod for producing spaced light spots on the surface of rising liquid below the rod, whereby the approach of said spots toward each other on the rising liquid level will plainly measure the approach of the liquid level to the contact rod

THOMAS P. ROGERS.